J. H. ANDERSON.
HARROW TOOTH FASTENING.
APPLICATION FILED JAN. 7, 1911.
1,023,492.
Patented Apr. 16, 1912.
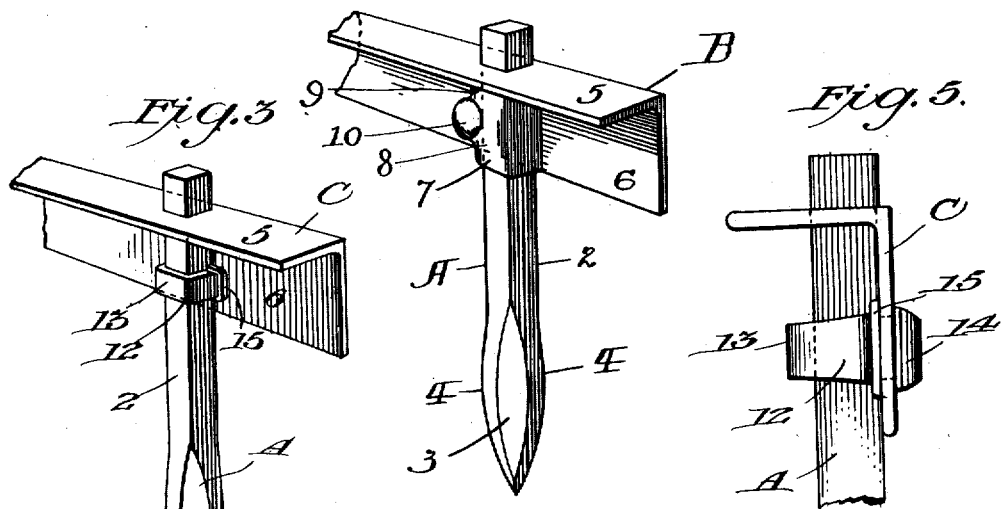
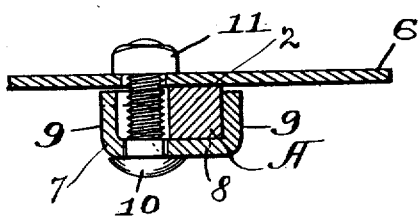
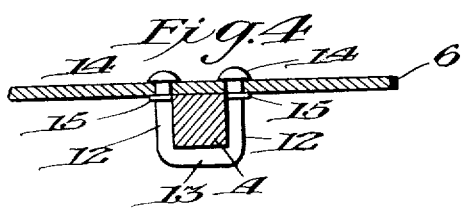
Witnesses:
Paul S. Smith
H. L. Fischer
Inventor:
John H. Anderson.
by: F. S. Bradbury
Attorney.

UNITED STATES PATENT OFFICE.

JOHN H. ANDERSON, OF ST. PAUL, MINNESOTA.

HARROW-TOOTH FASTENING.

1,023,492.  Specification of Letters Patent.  Patented Apr. 16, 1912.

Application filed January 7, 1911. Serial No. 601,376.

*To all whom it may concern:*

Be it known that I, JOHN H. ANDERSON, a citizen of the United States, residing at St. Paul, in the county of Ramsey and State of Minnesota, have invented a new and useful Improvement in Harrow-Tooth Fastenings, of which the following is a specification.

My invention relates to improvements in harrow teeth, and its object is to provide a tooth that is effective in form and is held rigidly connected to a harrow frame.

My invention provides a suitable tooth with a connection that is simple and strong, and that is economical in application and for renewal.

In the drawings with which I have illustrated my invention and which form part of the specification, Figure 1 is a perspective of a harrow tooth connected to a part of a harrow frame; Fig. 2 is a sectional view of the same construction showing the connection between the tooth and frame; Fig. 3 is a perspective of a similar tooth with a different form of the same connection; Fig. 4 is a sectional view of the connection shown in Fig. 3, and Fig. 5 is an elevation of the connection.

In the above drawings is shown a metal harrow tooth A having a square shank 2 and a cutting point 3, flattened diagonally of the tooth with curved edges 4. The shank 2 of the tooth A is attached to the angle bar B of which the metal harrow frame is made, passing up through the outstanding leg 5 of the angle which is apertured to fit the shank 2 tightly. A flat side of the shank 2 rests against the down standing leg 6 of the angle bar, and is held rigidly against it by a clamp 7 embracing the shank 2, and attached to the down standing leg of the angle bar. The clamp 7 as shown in Fig. 2 has a body 8 and embracing sides 9 fitted to the square shank 2 of the tooth A. The sides 9 of the clamp 7 extend nearly to the leg 6 of the angle bar allowing a slight clearance to permit tightening of the clamp 7 without forcing it against the angle bar. A bolt 10 passes through the body 8 of the clamp adjacent to the tooth shank 2, and the down standing leg 6 of the angle bar B, and has a nut 11 by which the clamp 7 may be drawn against the shank 2 of the tooth pressing it firmly against the angle B, and thus forming a rigid connection much more secure than can be obtained by placing the tooth with an edge against the frame. In the connection between the tooth A and harrow frame shown in Figs. 3 and 4, the clamp is attached to the down standing leg of the angle bar frame C by passing the sides 12 of the clamp 13 through the angle bar C and forming an upset head 14 on the other side of the angle bar. In upsetting the head 14 a shoulder 15 is formed simultaneously on the reverse side of the angle bar, which insures a tight connection between the clamp and the aperture in the angle bar through which it passes. The sides 12 of the clamp in this structure embrace three sides of the shank 2 closely with the fourth side resting against the angle bar and in the process of upsetting the portions of the sides which pass through the angle bar, the clamp 13 is drawn down very forcibly upon the shank 2 of the tooth A. In connecting the tooth A to the angle bar C the clamp 13 is pressed into position while hot and in cooling shrinks, forming a rigid connection. The connection is further strengthened by broadening the sides 12 of the clamp near the angle bar as shown in Fig. 5. The connection made in this way is permanently rigid, and the tooth A can be removed from the frame C only by breaking down the clamp 13. This is not however, a serious disadvantage as the clamp 13 is easily replaced and may even be made anew by an ordinary mechanic in a few moments. In the practical use of the harrow however, a tooth is very seldom broken and this construction is of great advantage in the rigidity of the connection and the ease of permanently tightening teeth that may become slightly loosened in use.

I am aware that it is not new to broadly secure a harrow tooth to an angle bar of a harrow frame, such construction being found in patents to Poole, #691,660; Moore, #447,472, and Hoshall, #584,738; but in these constructions as disclosed, the tooth is not secured to the bar with its side against the side of one leg of the angle.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. A harrow tooth fastener, comprising, in combination, a harrow frame bar, a harrow tooth having its shank placed against a side of said bar, and a yoke connected to said bar and shank upon said tooth to connect it to said bar said yoke having ends shouldered on one side of said bar and upset on the opposite side and being broadened where it is connected to said bar to stiffen said connection.

2. A harrow tooth fastener, comprising, in combination, a harrow frame having a horizontal part and a vertical part in cross section, a harrow tooth having a square shank in connection with said frame, said horizontal part of the frame being apertured to receive and engage the square shank of said tooth, and a clamp embracing three sides of the square shank, passing through the vertical part of the frame and upset on the other side thereof to form a rigid union of said tooth and frame.

3. A support for a harrow tooth, comprising, in combination, an angle bar frame, a harrow tooth having a flat side, the angle bar frame having one flange apertured to engage said tooth with its flat side resting against the other flange of said frame, and a yoke connected to said angle bar and shrunk upon said tooth to connect it to said angle bar, said yoke having ends shouldered within the angle bar and upset without the angle bar and being broadened where it is connected to said angle bar to stiffen said connection.

4. A harrow tooth fastener, comprising, in combination, an angle bar frame having one flange recessed to receive a harrow tooth, a harrow tooth in said frame having a shank engaged by said recess with a flat side resting against the other flange of said frame, a cutting point on said tooth flattened diagonally thereof to present a cutting edge diagonal to said tooth and fixed in cutting position on said frame and a yoke connected to said frame and engaging said tooth to hold it rigid upon said frame.

In testimony whereof, I have signed my name to this specification, in the presence of two subscribing witnesses.

JOHN H. ANDERSON.

Witnesses:
DAGMAR ANDERSON,
H. L. FISCHER.

---

Copies of this patent may be obtained for five cents each, by addressing the "Commissioner of Patents, Washington, D. C."